INVENTORS
OTTO J. ALDHART
PETER L. TERRY

United States Patent Office 3,623,913
Patented Nov. 30, 1971

3,623,913
FUEL CELL SYSTEM
Otto J. Adlhart, Newark, and Peter L. Terry, Madison, N.J., assignors to Engelhard Minerals & Chemicals Corporation
Filed Sept. 18, 1969, Ser. No. 859,111
Int. Cl. H01m 27/00
U.S. Cl. 136—86 R   16 Claims

ABSTRACT OF THE DISCLOSURE

In an air-breathing fuel cell stack, the air sweep simultaneously supplies oxidant and maintains the temperature and water balance in the cell. The individual cells of the stack contain an immobilized stable acid system as the electrolyte. A bipolar thermally conductive plate having a cooling fin on one side is disposed between and in contact with electrodes of adjacent cells. Gas flow channels on each of the electrode-contacting surfaces of the plates intercommunicate on the active area of the electrodes for distribution of the fuel and air over the electrodes. In a compact system, especially adapted for use in remote areas, the fuel cell assembly is used in combination with a hydrogen generator.

---

The invention herein described was made in the course of work under contract DAAK02-68-C-0407 with the United States Department of the Army.

BACKGROUND OF THE INVENTION

This invention relates to an apparatus comprised of a stacked fuel cell assembly and means for controlling the moisture, the temperature distribution, and the fuel and air feeds in the cell. In particular it relates to a reliable compact self-contained fuel cell system which is not limited to but is especially adapted for providing electric power in remote areas.

Fuel cells have various attractive advantages which make them potentially useful as a power source for many applications. Among the possible uses is a source of primary power in remote areas where the usual sources of power are unavailable and where service and maintenance of equipment would be limited. Examples in this area are unattended communications repeaters, navigational aids, and weather and oceanographic stations. For such applications the power system must be self-contained and the reliability of the system is of maximum importance.

Among the problems which have been present in fuel cell systems operating for extended periods of time are the control of temperature in the cells and the removal of waste products. Another problem is the ability of the system to continually supply and distribute the reactant feeds across the electrodes. It will be appreciated that each of these problems is highly complex. For example in the case of temperature control it is not only necessary to remove heat generated in the reaction, but also to accomplish this with a minimum temperature gradient across the electrodes. In the case of cells operating with a hydrogen containing fuel and an oxygen containing oxidant the product is water. The precise control of water removal has long been a problem. The difficulty lies in the fact that the rate of water removal has to match precisely the rate of water formation. When the reactant gases are used to remove the water from the cell, uniform distribution of the reactant gases and the temperature over the active cell area becomes particularly difficult. A close control of these factors is required to avoid imbalances with consequent harmful effects on the cell. The control of these critical operational problems becomes most acute when size, weight and complex self-containment constraints are imposed upon the design of the power system.

Various means have been proposed to solve these problems. The suggested methods of thermal control have depended in part on the type of electrolyte employed. For example, with liquid electrolytes, it has been suggested to circulate the electrolyte through an external cooling system. With an immobile electrolyte, stack cold plates, such as plates thermally connected to a cooling pipe through which coolant flows, or bipolar plates provided with cooling fins which extend into a separate cooling chamber, have been proposed. Generally, the previously suggested means for solving the problems have not been satisfactory mainly in that they add to the complexity while reducing the reliability of the system.

In accordance with the present invention an air-breathing fuel cell system is provided in which the control of temperature, product water, and distribution of sufficient oxidant to and across the electrodes is achieved without the use of an external cooling system, separate coolant fluids, or complex devices. Indeed the multiple function is achieved merely by the inlet air flow. Moreover, the control of temperature in the cells is achieved with a minimum of temperature gradient across the electrodes. The resultant power system has exceptional reliability and simplicity. This fuel cell system is advantageously operated in combination with a hydrogen generator as a source of primary electrical power for remote applications.

THE INVENTION

The fuel cell system of the present invention utilizes a cell stack made of a plurality of individual fuel cells, each cell including a fuel electrode, an oxidant electrode, and an immobilized stable liquid electrolyte system. Preferably the cells are electrically connected in series. Separating each adjacent cell and in contact with the electrodes is a thermally conductive impervious plate for current collection, reactant distribution, and temperature control. The bipolar plate has a fin projecting on one side and has gas flow channels on the electrode contacting surfaces. Preferably these channels are in the form of grooves. These grooves intercommunicate in the active area of the cell.

In accordance with an aspect of this invention, the air, the inlet of which is at the fin, is used to supply the oxidant, to regulate the temperature of the cell, and to remove the waste products from the cell. The cells of this invention use a hydrogen-containing feed and a free oxygen-containing feed. Water is a product which must be removed. The control of the temperature and the water removal in the cells of the stack are achieved in this invention by virtue of a combination of the choice of a particular type of electrolyte and by the sizing of the aforementioned bipolar plate.

The immobilized stable liquid electrolyte system used in a cell of this invention is characterized by having chemical and physical stability at the operating conditions of the cell, i.e. in a moderate temperature range fuel cell and in the presence of air. It is further characterized by a low vapor pressure and low volume change when subjected to the operating conditions of the cell. Although the cell is not limited in this respect, it has been found that concentrated phosphoric acid, e.g. 90 to 100% phosphoric acid is particularly suited as an electrolyte for the fuel cell system of this invention. It has been found, for example, that the properties of the concentrated phosphoric acid, with respect to its relationship to the air flow is such that the flow requirements for the removal of heat by far exceed that required for oxidant supply and water balance. Thus, the air flow can be adjusted so that sufficient oxident is fed to the cell, sufficient product water can be removed from the cell, and sufficient heat can be removed to maintain the cell at optimum operating conditions without disturbing the physical and chemical properties of the electrolyte and stable electrical characteristics are established in the system. An example of an electrolyte member especially suitable with respect to the heat and water balance in the cell is the electrolyte membrane of U.S. Pat. No. 3,453,149.

As noted above, the sizing of the bipolar plate is a factor in establishing the control of temperature and water removal in the fuel cell system of this invention. The sizing of the plate is indicated by size of the individual cells which in turn depends on the desired power capacity of the cell and by the thermal conductivity of the bipolar plate. It will be appreciated that such determinations will depend on the ultimate use of the cell, but in any system, the choice of power capacity and materials of construction are readily determined by one skilled in the art. For any particular system, the required active area of the cell A, the length of the path on the active area of the oxidant electrode L, and the area of the fin F must be determined. The active area of the cell is predetermined by the desired power output in the cell unit. The dimension L, defined by the length of the path on the oxidant electrode from the inlet to the outlet of air across the active area of the cell, is the minimum heat transfer path. L is determined by the equation:

$$L = \sqrt{\frac{2\Delta T K A t}{Q}}$$

Where:

$\Delta T$=the desired maximum temperature differential across the length L, nominally 5° C.
K=a constant, referring to the unit thermal conductivity of the materal used for the bipolar plate.
A=the active area of the cell.
$t$=the average thickness of the bipolar plate.
Q=the quantity of waste heat to be removed.

As indicated above active area A is predetermined by the desired power output of the cell. The constant K can be found, for example, in a metals handbook such as the 8th ed. Metals Handbook, vol. 1 by ASM. For example, the constant K for the magnesium alloy A–Z 31B is given at page 55 of said handbook at 0.23 cal./cm.²/cm./° C./sec. The thickness $t$ is the average thickness of the cross-sectional area of the bipolar plate perpendicular to the heat transfer path, adjusted for contour deviations, e.g. grooves, closely holding to the minimum dimension required by the design criteria of the plate material. The determination of Q, the quantity of waste heat to be removed, is well known by those skilled in the art.

With respect to the dimensions of the fin, sufficient surface area must be present for removal of the waste heat. This can be calculated in accordance with well known principles in the heat exchange field. It has been found, for example, that in a cell producing 0.7 v. and 20 amps and to which the air flow is about 2.0 standard cubic feet per minute (s.c.f.m.), about 24 square inches of fin are needed for heat removal. It will be noted that the fin is channeled on the air entry side of the plate, thereby increasing the available surface for heat removal, and the surface of the fin on the side of the plate contacting the $H_2$ electrode of the adjacent cell provides additional cooling surface area.

In selecting a suitable material of construction for the bipolar plate, the corrosive environment of the cell and the electrical and thermal conductivity of the material and its cost are considerations. Where weight is also a factor, the plate is suitably constructed, for example, of aluminum or magnesium having a protective coating, e.g. gold. Other suitable materials include titanium, niobium, tantalum, and alloys, e.g. nickel-tantalum, tantalum-niobium, and graphite, carbon containing plastic composites, and the like.

The air enters the cell at the fins and such fins are disposed relative to the air flow so that the heat of the cell is conducted counter-current to the flow of air. As indicated above, since in the present fuel cell system, the flow requirements for heat removal by far exceed that required for either sufficient feed of oxidant to the cathode or for water removal, the operation of the fuel cell can be controlled by merely varying the amount of air admitted to the fuel cell. The air flow rate required to maintain the cell at constant temperature when the cell is in operation will of course vary as the environmental or cell conditions change. It has been found that in the present cell, the cell temperature can be used as the control to regulate the change in air flow. This is accomplished with a blower proportionately controlled over a small temperature range and activated by a change in cell temperature.

Using the electrolyte and bipolar plate in accordance with the foregoing principles the temperature gradient is maintained constant in the cell. In a preferred embodiment of this invention the temperature gradient is maintained within about 5° C.

In accordance with another aspect of this invention, the fuel stack is used in electrical combination with a generator, which generator releases free hydrogen-containing gas from a fuel containing hydrogen in a chemical combined state. For example, ammonia or a hydrocarbon may be the source of the hydrogen. In a preferred embodiment the hydrogen is produced by catalytic dissociation of anhydrous ammonia and a part of the electrical energy produced by the fuel cell is supplied to the generator to provide energy to dissociate the fuel. The use of electrical energy to control the reaction in the hydrogen generator adds to the reliability of the system.

The invention will be more fully understood by reference to the attached drawings, in which.

Figure 1:
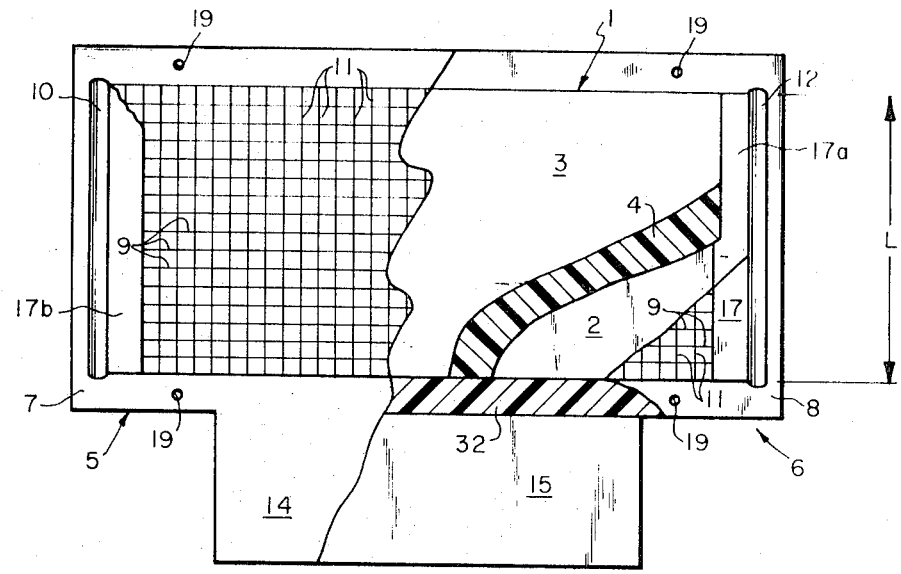
FIG. 1 is a cut-away view showing the construction of a single cell from the fuel entry side, with a bipolar plate on the face of each of the electrodes.
Figure 2:
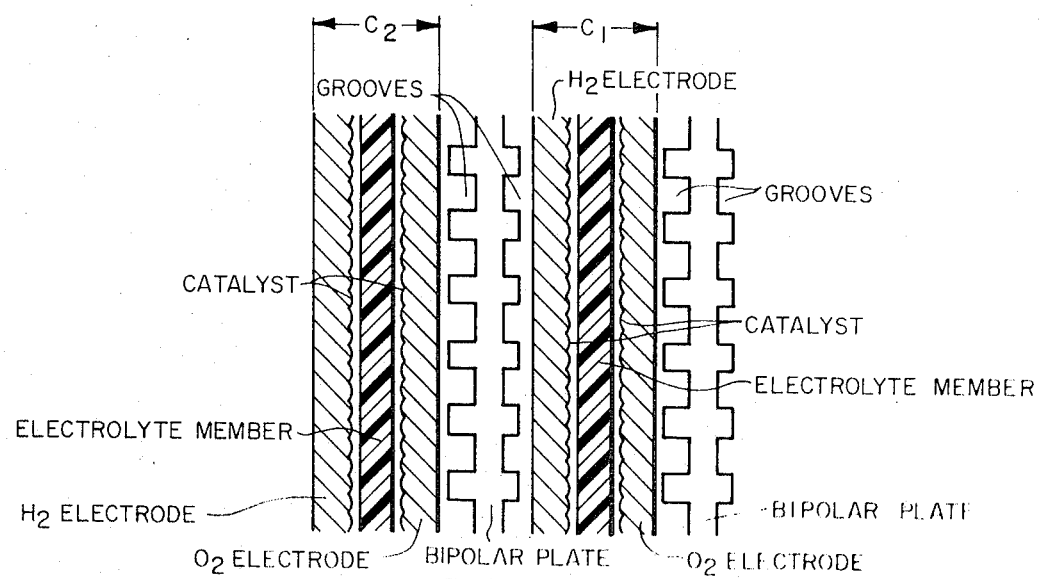
FIG. 2 is an enlarged and schematic cross-sectional detail of a cell stack, partly spaced apart.

Referring to FIG. 1, each cell 1 consists of a fuel electrode 2, an oxidant electrode 3, and an electrolyte member 4 which consists of an immobilized electrolyte, e.g. 85 to 100% phosphoric acid, retained in a microporous matrix, for example, polytetrafluoroethylene, as described in U.S. Pat. No. 3,453,149. Useful electrodes for this cell structure are constructed of platinum group metal catalyzed porous polytetrafluoroethylene metallized on the surfaces and throughout the pores with a gold coating. Electrodes of this type are described in U.S. application Ser. No. 685,220 filed on Sept. 27, 1967 and in an article by Dr. O. J. Adlhart in Engelhard Industries Technical Bulletin vol. VIII (1967) at page 57. Cells using a membrane and electrodes as described above operate at a temperature from about 100 to 200° C., and preferably at about 125° C. FIG. 1 shows the cell elements 2, 3 and 4 which make up the cell 1, also referred to herein as the cell laminate, between bipolar plates 5 and 6. The bipolar plates are impervious metal plates, e.g. of gold-coated aluminum which separate adjacent cells and, as shown in FIG. 2, each bipolar plate lies between a fuel electrode of one cell, e.g. $C_1$, and an oxidant electrode of the adjacent cell, e.g. $C_2$. In the cut-away view of FIG. 1 only the surfaces 7 and 8 of the bipolar plates which contact the fuel electrodes are shown. Grooves 9 serve as gas flow passages for the hydrogen-containing fuel, e.g. $H_2$, which enters the cell at oval port 10. Grooves 11, perpendicular to grooves 9, form a crisscross pattern which aids in the distribution of the fuel electrodes. Outlet 12 is provided for unused feed gas.

Figure 3:
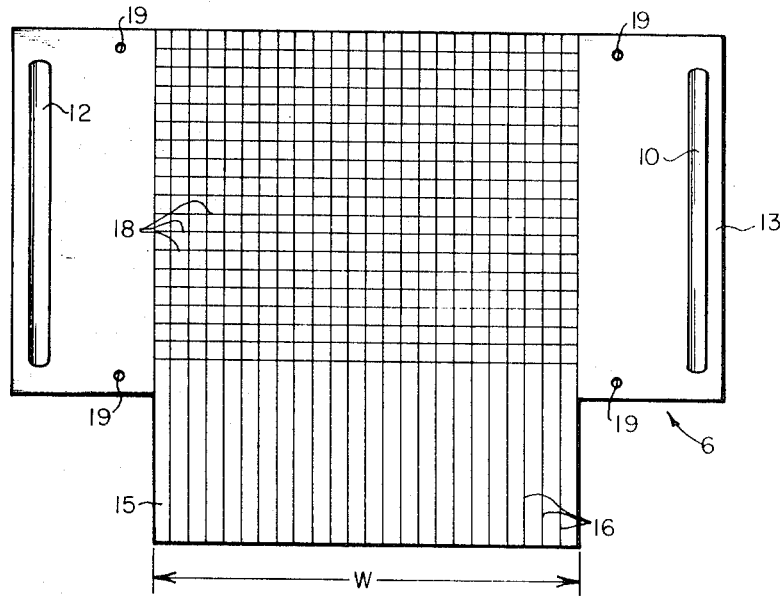
FIG. 3 is a plan view of the side of a bipolar plate which faces on the oxidant electrode.

FIG. 3 shows the crisscross groove pattern of a bipolar plate 6 on surface 13. Surface 13 contacts an oxidant electrode. As will be seen from FIGS. 1, 3 and 4, each bipolar plate has a cooling fin projecting on one side. For example, bipolar plates 5 and 6 of FIG. 1 have fins 14 and 15, respectively. It will be noted in FIG. 1 that on the surfaces 7 and 8 of the bipolar plates, which contact the fuel electrodes, the fins are not grooved, however, this is optional. The surface of the fins on the side of the plate which contacts the fuel electrode may be grooved, e.g. for increased surface area. On the oxidant surface 13 of the bipolar plate, as shown in FIG. 3, the grooves 16 extend from the outer edge of fin 14 to the opposite side of the bipolar plate. The grooves 18, perpendicular to grooves 16 form a crisscross pattern for oxidant distribution on the oxidant electrode. For increased surface area, it is preferred to have the grooves on the oxidant side of the plate extend to the outer edge of the fin.

Although the gas flow channels are shown as grooves in the embodiments of FIGS. 1, 2, 3, and 4, it will be appreciated that the channels can take other forms, e.g. the plate can be embossed, or screens or expanded metal structures can be placed over the bipolar plate. Also, the crisscross pattern, shown for example in FIGS. 1 and 3, is only one of a number of configurations suitable for the surfaces of the bipolar plate. The purpose of the crisscross pattern is to distribute the reactant feeds across the electrodes. An important feature of the crisscross grooves is that the gas flow passages interconnect for good gas distribution across the active area of the cells.

Reference to FIG. 2 shows the arrangement of the cell members and bipolar plates in a stack. It will be noted that the grooves of the bipolar plate on the side facing the oxidant electrode are deeper than the grooves on the side facing the fuel electrode. For example, in a coated aluminum plate of about 1/8" thickness, the grooves on the oxidant electrodes surface are 0.03" wide by 0.05" deep on 0.05" center. On the fuel surface, the grooves are 0.03" wide by 0.03" deep on 0.05" center. The purpose of the deeper grooves on the oxidant surface of the plate is to minimize the pressure drop on the oxygen side without sacrificing the effective thermal conductivity of the plate. This air flow design is especially advantageous in that it reduces the back pressure even at high flow rates and back pressure under most conditions will be about 10 mm. of $H_2O$.

A fuel stack of the present invention uses a plurality of the individual cells as shown in FIGS. 1 and 2 bolted together externally with end plates (not shown) and aligned by guides provided, e.g. in holes 19 of plates 5 and 6. Thin narrow metal shims 17, 17a and 17b are provided between the electrodes and the bipolar plates to act as spacers and to prevent the cell laminate from penetrating the grooves. Gasket 32, which encompasses the cell laminate, serves as a seal between adjacent bipolar plates 5 and 6 and the perimeter of the cell laminate. FIGS. 1 and 2 show oval openings, 10 and 12 in bipolar plates 5 and 6. In the stack these oval openings serve as fuel manifolds. When stacking the bipolar plates these openings form chambers on either side of the stack. It has been found advantageous to direct the fuel flow to the stack in such a way that groups of cells are in series. This permits maximum utilization of the hydrogen in dilute hydrogen streams. The manifolding of air is accomplished by the insulation surrounding the stack (not shown).

Figure 4:
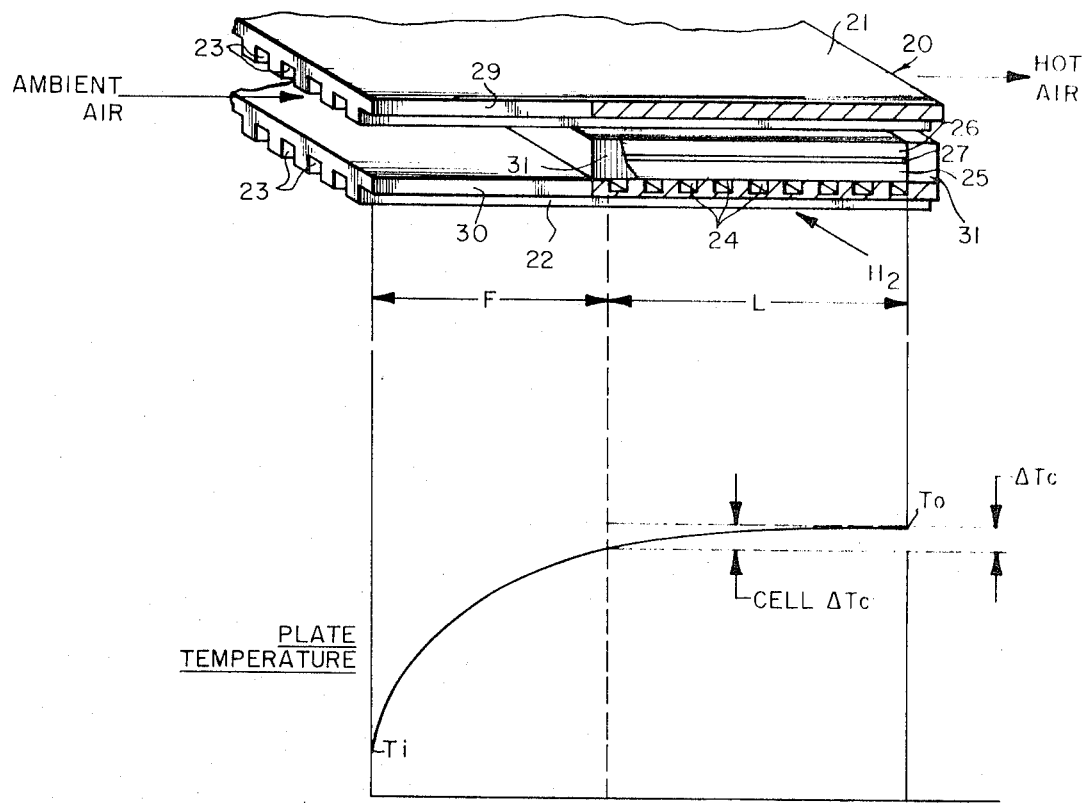
FIG. 4 is a schematic isometric detail showing two sides of the bipolar plate the flow passages for fuel and air, and it shows graphically the temperature profile across the plate.

The design principles of the cell are shown schematically in FIG. 4. The schematic detail 20 of a cell stack shown in FIG. 4 comprises a cover plate 21 and a bipolar plate 22 and a cell laminate consisting of an anode 25, a cathode 26 and an electrolyte member 27. The cover plate 21 has air flow passages 23 and the bipolar plate has air flow passages 23 and fuel flow passages 24. As noted above, the electrolyte member is comprised of a stable liquid electrolyte system, e.g. of immobilized phosphoric acid. The cell has an active area which is determined by $L \times W$. L is the length of the oxidant path and W is the length of the fuel path in the active area of the cell measured from entry to outlet of the reactants to the active area. The measurement L can be seen in FIG. 1 and the measurement W in FIG. 3. The cell element functions as follows: Cold air enters the cell 20 from the side where the plates 21 and 22 extend on one side beyond the active area of the cell. These extensions 29 and 30 serve as cooling fins on which air will preheat before it reaches the active cell area. The waste heat generated over the cell area is conducted to fins 29 and 30. The thermal efficiency of the plates, determined by their thermal conductivity and design, in accordance with the foregoing principles, is sufficiently high so that significant temperature gradients over the active area and consequently variations in current density are essentially avoided.

It will be further observed in FIG. 4 that the fuel flow is perpendicular to the air flow. While this is not an essential feature of the cell, it is convenient configuration for simple manifolding of the feeds to the cell. The air enters the cell element 20 on the side of the fins and in a direction concurrent with the path of the grooves 23, is preheated on the fins, and leaves the cell on the opposite side at cell temperature. The fuel, e.g. $H_2$, enters the cell through grooves 24. As indicated above, for steady operation of the stacked cells, regardless of ambient temperature, air humidity and load conditions, one only has to assure that the temperature remains constant. This can be accomplished readily by varying the flow of cold air admitted to the stack. Brushless type D.C. motors which have long life and which can be controlled by a thermocouple quite easily, e.g. Siemens 1 AD Series, available from Siemens America Incorporated, New York, N.Y., have been developed recently, and such motors are ideally suited for the control of the air flow to the cells. Seals 31 in FIG. 4 prevent leakage of the reactants. The seal may be in the form of a gasket, e.g. of polytetrafluoroethylene which completely surrounds and encases the cell laminate consisting of the matrix and two electrodes. Thin shims or spacers (not shown) well known in the art are used to keep the seals and the cell laminate from blocking the grooves of the bipolar plate. FIG. 4 shows graphically the temperature profile across the active area of the cell, and the temperature gradient in the cell is represented by $\Delta T_c$, the air inlet temperature by $T_i$ and the air outlet temperature by $T_o$. As noted above, the temperature gradient in the plate is very small relative to the difference in temperature between the inlet and outlet air. Because of the small temperature gradient in the plate, it has been found that the control sensor which activates the air flow can be advantageously located at the air inlet site to the active area of the cell. At this location, the control signal will be more sensitive to changes in temperature and the air flow will be adjusted more rapidly to changes in the cell, e.g. changes in load, ambient temperature, etc.

In an embodiment of the invention using the design principles shown in FIG. 4, the plates employed are 3 mm. thick aluminum coated with a thin gold plate as a suitable protection against attack by the electrolyte. The cell laminate is about 1 mm. in thickness. At a cell width of 10 cm. and a current density of 100 ma./cm.², the temperature gradients observed between the highest and lowest point are about 5° C.

Figure 5:
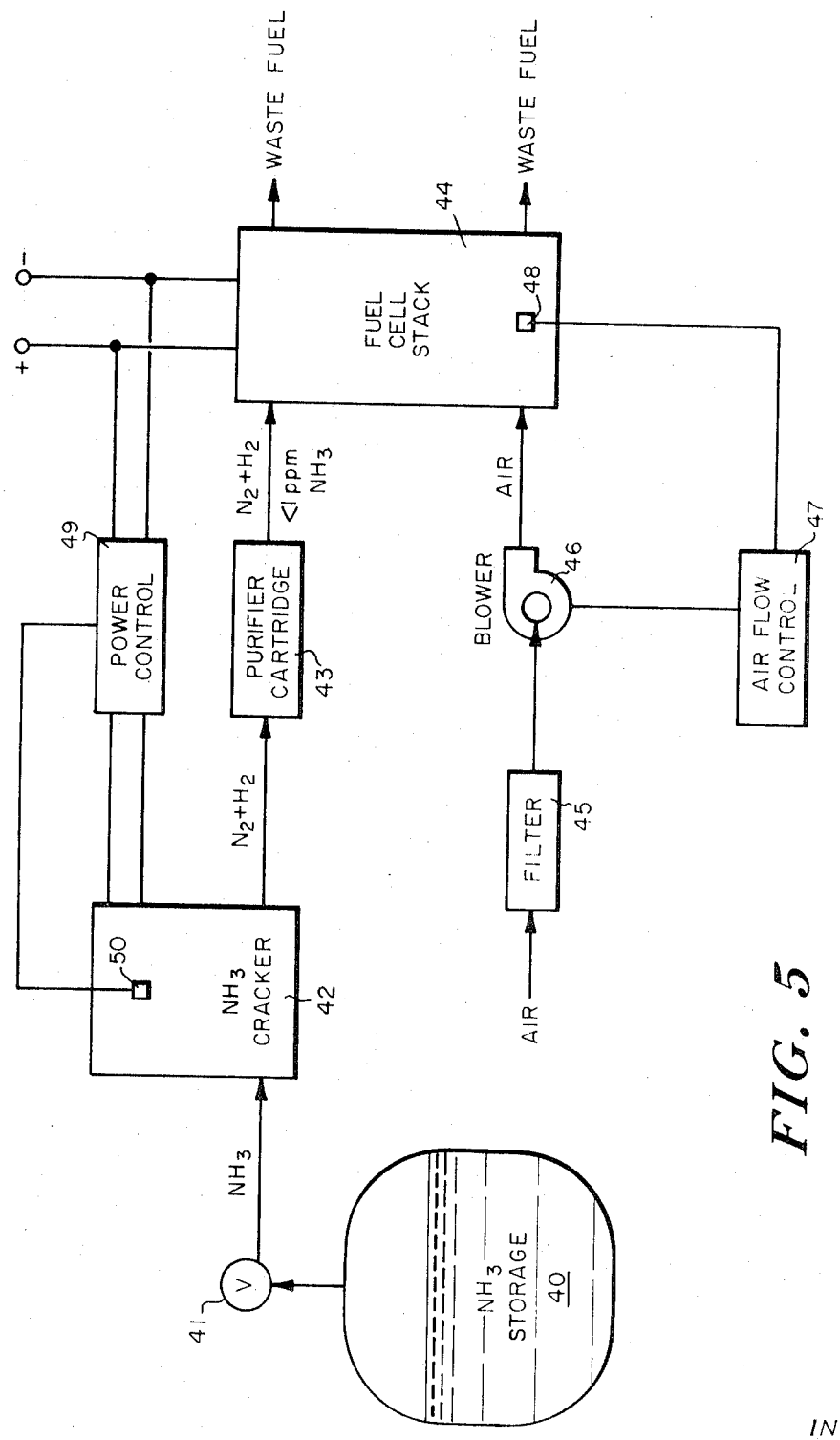
FIG. 5 is a schematic chart showing a fuel stack of this invention employed in combination with a hydrogen-producing generator.

A schematic diagram of a combined ammonia generator with a fuel cell stack of this invention is shown in FIG. 5. It will be understood that other hydrogen generators may be used, e.g. a steam reformer for liquid hydrocarbon. However, ammonia is particularly suited for conversion because of its world-wide availability at a relatively reasonable cost. In FIG. 5 ammonia is passed from storage tank 40, and metered through metering valve 41 to the catalytic cracker 42. The effluent $H_2-N_2$ stream from the cracker 42, after passing through a purifier cartridge 43 e.g. containing a molecular sieve or sulfuric acid absorbed on silica gel, to remove traces of $NH_3$, e.g. to less than 1 p.p.m., enters the anode manifold (not shown) of the fuel cell stack 44. Air for the fuel cell reaction passes through filter 45 to remove particulate matter and is supplied through an air manifold formed by insulation (not shown) to the cathode cavity (not shown) of the stack 44 by a low pressure blower 46. As shown above, this air stream in addition to providing the oxygen for the electrochemical reaction is controlled to effect heat and water removal as well. The regulation of the air flow is effected by a temperature responsive flow control device 47, e.g. a D.C. brushless type motor of the type described above which is controlled by a temperature activated device such as a Control Data Model 73 Magsense temperature controller, manufactured by Control Data Corp., in contact with a temperature sensing means 48, e.g. a thermocouple, which is so disposed in the fuel cell stack as to sense the operating temperature of the fuel cell stack. As noted above, it has been found advantageous to sense the temperature at the air inlet of a bipolar plate in the stack for rapid sensitive relay to the temperature responsive device.

With respect to the dissociation of the $NH_3$ into $H_2$ and $N_2$, the reaction is highly endothermic. The $NH_3$ is dissociated catalytically in the cracker, e.g. using a ruthenium catalyst such as Ru on $Al_2O_3$. This reaction is well known. For example, a generator of the type described in "Compact $H_2$ Generators for Fuel Cells," H. H. Geisler, in Proceedings of the 17th Annual Power Sources Conference, Atlantic City, May 1963, may be used. In the combined system of this invention, however, the energy requirements are derived partially or entirely from the energy produced by the fuel cell. Temperature responsive control device 49, e.g. a Control Data Model 73 Magsense temperature controller, in contact with a temperature sensing means 50, e.g. a thermocouple, in the catalytic cracker 42 regulates the delivery of electricity to the cracker from fuel cell stack 44. Additional energy may be provided from the combustion of the anodic exhaust. For small capacity power sources, e.g. about 500 watts or less, the energy for the ammonia dissociator is preferably supplied entirely by the electricity produced in the fuel cell.

A combined system of this type is effective in environments having a temperature of about $-40°$ F. to $125°$ F. and a relative humidity of 0% to a dew point of $85°$ F. Generally there are no limitations on the power level. The number and size of the laminates in a fuel cell stack is determined by the voltage and current (or wattage) requirements of the specific application. Preferably the system delivers about 10 to 2000 watts. The voltage range is about 6 to 48 volts D.C., with other ranges possible with inversion.

EXAMPLE 1

A typical 200 watt stack designed to produce about 12 volts is composed of 17 cell laminates each having an active area of 200 cm.² The cell laminates, composed of air and fuel electrodes and a phosphoric acid matrix type electrolyte member, are of the type set forth in the aforementioned article by Dr. Adlhart. The electrodes are constructed of porous polytetrafluoroethylene metalized with gold and activated by bonding a thin layer of precious metal catalyst, e.g., platinum black, to one surface of the metalized sheet. In the stack, the catalyzed surface of the electrode is positioned adjacent to the electrolyte member. The total thickness of the cell laminate is about 1 mm.

Between each adjacent cell laminate is a bipolar plate constructed of 1/8" thick 6061 aluminum alloy machined with 0.030" wide grooves on 0.050" centers in the direction of reactant flow and 0.130" centers perpendicular to the direction of reactant flow. The grooves are 0.050" deep on the air flow surface of the plate and 0.030" deep on the fuel flow surface. The plate is approximately 11½" x 7¼", with 3¾" length L on the active area of the cell from the inlet to the outlet of air, and 8" length W on the active area of the cell from the inlet to outlet of fuel, and has a heat exchange fin 8" wide projecting 2" beyond the forward edge of the cell laminate. Each plate has fuel manifold holes spaced apart at a closest distance of 10¼" on opposite sides of the plate for fuel entry perpendicular to the air entry to the plate. As indicated above, it is convenient and preferred to have the air flow and fuel flow oriented in perpendicular relationship to each other and it will be noted that the fuel flow path defined on the bipolar plate between the inlet and outlet apertures is longer than the air flow path defined on opposite surface of the plate between the air inlet and outlet in the active area of the cell. Gasket material of peroxide cured high temperature ethylene-propylene polymer encases the cell laminate and serves as a seal between the adjacent bipolar plates. Thin narrow shims of 0.005" thick goldplated brass are provided between the electrodes and bipolar plates to act as spacers and prevent the cell laminate from penetrating the grooves. The stack is clamped between end plates made of 1" thick aluminum jig plate, and the clamping force is provided by 3/8" bolts. The housing of the stack is made of rigid insulating board, e.g. Johns Manville Marinite 36. The housing serves to reduce heat losses to the surroundings and to provide manifolding for the inlet air. Air at ambient temperature is fed through a microporous felt mat filter to the air inlet manifold of the fuel cell stack. The air flow is regulated by a 1½" diameter impeller squirrel cage blower powered by a Siemens 1 AD 3004 brushless D.C. motor. A Control Data Model 73 Magsense unit is connected to the electronics of the motor to give time proportional control between two pre-set motor speeds. Air flow at the higher blower speed is 3 s.c.f.m. and at the lower speed 0.8 s.c.f.m. A Chromel-Alumel thermocouple in contact with the Magsense unit is positioned to sense the temperature of the cell stack at the air inlet to the active area of the cell.

The fuel, e.g. pure $H_2$ or a mixture consisting of 75% $H_2$ and 25% $N_2$, is fed to the fuel manifold at a rate of approximately 3.59 liters per minute.

In the laboratory model, the start-up of the cell is provided by electrical heaters attached to the cell plates in the stack and the stack is brought up to operating temperature, i.e. about $125°$ C., by means of an external power source applied to the heaters. Upon reaching a temperature of about $125°$ C., fuel and air are fed to the stack, load applied, and the start-up heaters disconnected.

Using pure hydrogen as the fuel, at a hydrogen utilization in excess of 99%, the cell produces 11.9 volts at 19.4 amps. Using a fuel containing 25% nitrogen and the balance hydrogen, at a hydrogen utilization in excess of 90%, the cell produces 11.5 volts at 19.6 amps. The air flow required to maintain thermal equilibrium at an ambient temperature of $30°$ C. is about 1.9 s.c.f.m.

A 200-watt fuel cell stack of the type described above was observed to have constant performance over a period in excess of 650 hours with the stack temperature remaining substantially constant despite fluctuations in the ambient temperature from about $20°$ to $35°$ C.

EXAMPLE 2

For a power system having a net output of about 100 watts, a fuel cell stack of the type described in Example 1 is integrated with a catalytic ammonia cracker designed to deliver about 3.59 liters per minute of a fuel consisting essentially of about 75% $H_2$ and 25% $N_2$. Ammonia is metered as a gas to the ammonia cracker from a storage tank containing anhydrous ammonia at the rate of 3 gram moles per hour. The ammonia cracker, containing about 60 grams of 5% ruthenium supported on alumina operates at about $800°$ C. to produce an $H_2+N_2$ stream containing about 50 p.p.m. $NH_3$. To maintain the temperature at the reaction temperature about 60 watts of electricity are required. The product stream is passed through a purifier cartridge containing 50% $H_2SO_4$ on silica gel. (About 2 kilograms of this material would be sufficient to purify the fuel feed of this magnitude for about a year.) In the purifier the $NH_3$ in the stream is reduced to less than about 1 p.p.m. The purified $H_2$—$N_2$ stream is fed to the fuel manifold of the stack. Air is fed to the stack which is operated as described in Example 1.

A Control Data Magsense 73 unit operating in a time proportioning mode is used to control a switching transistor, which in turn controls the power to the cracker. This temperature sensitive device is used in connection with a Chromel-Alumel thermocouple, which senses the temperature in the cracker, to maintain the reaction temperature in the cracker, i.e. about 800° C.

Initial start-up of the system may be provided, for example, by a battery powered generator, or by burning ammonia to bring the system to operating temperature, and thereafter the integrated $H_2$-generator and fuel cell stack will operate unattended, the temperature and humidity balance being regulated by the air flow and the heat required for the ammonia cracking reaction being provided by a part of the energy produced in the stack. The operating current density is about 80 ma./cm.$^2$.

In an integrated system of the type described above the power distribution is approximately as follows:

|  | Watts |
|---|---|
| Stack production | +168 |
| Ammonia cracker | −60 |
| Power control (for shunting power to cracker) | −5 |
| Air flow control (including the blower) | −3 |
| Net output | 100 |

What is claimed is:

1. A fuel cell system comprising:
   (a) a plurality of individual fuel cells stacked in substantially parallel relationship to each other, each cell including a catalytic fuel electrode to which a hydrogen-containing gas is fed, a catalytic oxidant electrode to which air is fed and an electrolyte member therebetween comprised of an immobilized stable liquid, said cell having an active area defined therein;
   (b) a thermally conductive impervious bipolar plate disposed between adjacent cells in said stack, said bipolar plate having on opposite faces thereof a first surface which contacts a fuel electrode and a second surface which contacts an oxidant electrode, manifold apertures spaced apart in said plate for inlet and outlet of the fuel to the fuel electrode, and a cooling fin projection on one side of the plate, said fin extending beyond the active area of the cell, and said electrode contacting surfaces having a plurality of channels which define gas flow paths between said surfaces and the electrodes, the channels on said second surface being located at the inlet substantially across the active area of the cell and extending from the fin to the opposite side of the bipolar plate and defining a gas flow path between the air inlet and outlet on the active area of the cell and intercommunicating in the active area of the cell, and said channels on said first surface being located at the inlet substantially across the active area of the cell and extending from the inlet to the outlet fuel manifold apertures and defining a fuel flow path therebetween and intercommunicating in the active area of the cell;
   (c) air inlet means for distributing air to the channels on the edge of the fin on said second surface of the bipolar plate, and fuel inlet means for distributing fuel to the inlet manifold to said first surface of the bipolar plate; and
   (d) means to regulate the air-flow to the air inlet means.

2. The fuel cell system of claim 1 wherein the electrolytic member is concentrated phosphoric acid immobilized in a microporous matrix.

3. The fuel cell system of claim 1 wherein the length of the gas flow path on said second surface of the bipolar plate from the inlet to the outlet of air across the active area of the cell is the minimum heat transfer path.

4. The fuel cell system of claim 1 wherein the channels on the second surface extend from the outer edge of said fin in to the opposite side of the bipolar plate.

5. The fuel cell system of claim 1 wherein the channels on opposite surfaces of the bipolar plate are in the form of grooves.

6. The fuel cell system of claim 5 wherein the channels interconnect in a crisscross pattern in the active area of the cell.

7. The fuel cell system of claim 1 wherein the channels on opposite surfaces of the bipolar plate are in the form of expanded metal structures.

8. The fuel cell system of claim 1 wherein the air-flow regulating means is a temperature activated device.

9. The fuel cell system of claim 8 wherein the temperature activated device is responsive to a change in temperature of the bipolar plate at the air inlet to the active area of the cell.

10. The fuel cell system of claim 3 wherein the air inlet means and fuel inlet means are oriented in perpendicular relationship to each other and the fuel flow path defined on the first surface of bipolar plate between the inlet and outlet apertures is longer than the air flow path defined on the opposite surface of the bipolar plate between the air inlet and outlet in the active area of the cell.

11. The fuel cell system of claim 1 wherein the air inlet means is disposed for air flow parallel to said air flow paths extending from said fin to the opposite side of the bipolar plate, whereby the air flow to the plate and heat conduction from the plate are counter-current to each other.

12. The fuel cell system of claim 1 wherein the fuel inlet means to the cells of the stack are disposed for fuel flow to groups of said cells in series.

13. A self-contained primary electric power unit comprising in electrical combination the fuel cell system of claim 1 for providing electric power and an electrically controlled reactor for the production of a free $H_2$-containing gas from a fuel containing $H_2$ in chemically combined form, such production of $H_2$-containing gas requiring energy, means to supply a part of the electric power produced by the fuel cell system to the reactor, and means to deliver the free $H_2$-containing fuel produced in the reactor directly to the fuel inlet of the fuel cell system.

14. The self-contained primary electric power unit of claim 13 wherein the air-flow regulating means of said fuel cell system is a temperature activated device.

15. The self-contained primary electric power unit of claim 13 wherein the means to supply part of the power produced by the fuel cell system to said reactor is a temperature activated device.

16. The self-contained primary electric power unit of claim 13 wherein the fuel containing $H_2$ in chemically combined form is anhydrous ammonia.

References Cited

UNITED STATES PATENTS

| 3,061,658 | 10/1962 | Blackner | 136—86 |
| 3,146,131 | 8/1964 | Linden et al. | 136—86 |
| 3,180,813 | 4/1965 | Wast et al. | 136—86 |
| 3,436,272 | 4/1969 | Gelting | 136—86 |

WINSTON A. DOUGLAS, Primary Examiner

H. A. FEELEY, Assistant Examiner